(12) United States Patent
Pemasiri et al.

(10) Patent No.: US 12,299,852 B2
(45) Date of Patent: May 13, 2025

(54) BODY POSE TRACKING OF PLAYERS FROM SPORTS BROADCAST VIDEO FEED

(71) Applicant: STATS LLC, Chicago, IL (US)

(72) Inventors: Akila Pemasiri, Brisbane (AU); Patrick Joseph Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 326 days.

(21) Appl. No.: 17/930,923

(22) Filed: Sep. 9, 2022

(65) Prior Publication Data

US 2023/0073940 A1 Mar. 9, 2023

Related U.S. Application Data

(60) Provisional application No. 63/261,029, filed on Sep. 9, 2021.

(51) Int. Cl.
*G06T 5/70* (2024.01)
*G06T 5/20* (2006.01)
(Continued)

(52) U.S. Cl.
CPC ............. *G06T 5/70* (2024.01); *G06T 5/20* (2013.01); *G06T 7/60* (2013.01); *G06T 7/73* (2017.01); *G06T 2207/10016* (2013.01); *G06T 2207/20081* (2013.01); *G06T 2207/30196* (2013.01); *G06T 2207/30221* (2013.01)

(58) Field of Classification Search
CPC .... G06T 5/70; G06T 5/20; G06T 7/60; G06T 7/73; G06T 2207/10016; G06T 2207/20081; G06T 2207/30196; G06T 2207/30221; G06T 7/75; G06T 7/251
See application file for complete search history.

(56) References Cited

U.S. PATENT DOCUMENTS

| 6,057,859 | A | 5/2000 | Handelman et al. |
| 7,257,237 | B1 * | 8/2007 | Luck ...................... G06T 7/251 382/103 |

(Continued)

OTHER PUBLICATIONS

PCT International Application No. PCT/US22/76206, International Search Report and Written Opinion of the International Searching Authority, dated Nov. 22, 2022, 9 pages.
(Continued)

*Primary Examiner* — Charles T Shedrick
(74) *Attorney, Agent, or Firm* — Bookoff McAndrews, PLLC

(57) ABSTRACT

Examples disclosed herein may generate a refined and denoised body pose data from a video feed of a sporting event. Tracking data containing player locations may be used to determine correspondence between a location and a body pose. For example, body pose with middle of key footpoints with shortest distance from the location may be selected as a likely body pose for the location. The body pose data may be refined to estimate the length of missing limbs or limbs with unusual length ratios. The body pose data may further be filtered to filter out unwanted body poses such as body poses of spectators or noisy body poses. The refined and filtered body pose data may be used for other downstream processing such as projecting the body poses to a three dimensional play surface.

17 Claims, 14 Drawing Sheets

(51) Int. Cl.
*G06T 7/60* (2017.01)
*G06T 7/73* (2017.01)

(56) References Cited

U.S. PATENT DOCUMENTS

| | | | | |
|---|---|---|---|---|
| 10,095,945 | B2* | 10/2018 | Wnuk | G06F 16/532 |
| 11,570,421 | B1* | 1/2023 | Rush | H04N 13/207 |
| 2007/0279494 | A1* | 12/2007 | Aman | H04N 5/278 |
| | | | | 348/169 |
| 2021/0356599 | A1* | 11/2021 | Liu | B60W 60/0011 |
| 2021/0365707 | A1* | 11/2021 | Mao | G06V 10/25 |
| 2022/0172429 | A1* | 6/2022 | Tong | G06T 7/55 |
| 2022/0198719 | A1* | 6/2022 | Han | H04N 19/17 |
| 2023/0059287 | A1* | 2/2023 | Lau | G06T 17/00 |
| 2023/0063926 | A1* | 3/2023 | Zhang | G06V 10/22 |
| 2023/0222830 | A1* | 7/2023 | Lopez Mendez | G06T 7/50 |
| | | | | 382/154 |
| 2023/0346575 | A1* | 11/2023 | Cabibihan | A61F 2/586 |
| 2023/0394695 | A1* | 12/2023 | Pei | G06T 7/60 |
| 2023/0401740 | A1* | 12/2023 | Zhang | G06T 3/4007 |

OTHER PUBLICATIONS

Li, et al., "Multi-person pose estimation using bounding box constraint and LSTM," IEEE Transactions on Multimedia 21.10, 2019, pp. 2653-2663.

Javadiha, et al. "Estimating Player Positions from Padel High-Angle Videos: Accuracy Comparison of Recent Computer Vision Methods," Sensors 21.10, 2021, 17 pages.

Pishchulin, et al., "Deepcut: Joint subset partition and labeling for multi person pose estimation," Proceedings of the IEEE conference on computer vision and pattern recognition, 2016, pp. 4929-4937.

Toshev, et al., "Deeppose: Human pose estimation via deep neural networks," Proceedings of the IEEE conference on computer vision and pattern recognition, 2014, 8 pages.

* cited by examiner

BODY POSE TRACKING OF PLAYERS FROM SPORTS BROADCAST VIDEO FEED

CROSS-REFERENCE TO RELATED APPLICATIONS

This application claims priority to U.S. Provisional Application Ser. No. 63/261,029, filed Sep. 9, 2021, which is hereby incorporated by reference in its entirety.

FIELD OF THE DISCLOSURE

The present disclosure generally relates to processing of sports broadcast video feeds, and more particularly to tracking body poses of players in the sports broadcast video feeds.

BACKGROUND

Computer based sports analytics is being used extensively these days for many types of sports. Sports analytics is being used for, among other things, player training, game analysis, and identifying effective play strategies. Sports analytics generally involves tracking the locations of players in the play area (e.g., a basketball court). However, conventional sports analytics does not provide denoised and refined body poses from a sports broadcast.

SUMMARY

In some embodiments, a method is disclosed herein. The method may comprise receiving, by a computing system, raw body pose data of a plurality of players in a video frame of a sporting event video feed. The method may further comprise retrieving, by the computing system, location data for the plurality of players in the video frame. The method may also comprise determining, by the computing system, correspondence between at least one location from the location data to a raw body pose data of at least one player of the plurality of players. The method may additionally comprise denoising and refining, by the computing system, the raw body pose data of the at least one player based on the at least one location and further based on a machine learning model In some embodiments, a non-transitory computer readable medium is disclosed herein. The non-transitory computer readable medium may comprise one or more sequences of instructions, which, when executed by a processor, may a computing system to perform operations comprising receiving, by the computing system, raw body pose data of a plurality of players in a video frame of a sporting event video feed. The operations may further comprise retrieving, by the computing system, location data for the plurality of players in the video frame. The operations may further comprise determining, by the computing system, correspondence between at least one location from the location data to a raw body pose data of at least one player of the plurality of players. The operations may further comprise denoising and refining, by the computing system, the raw body pose data of the at least one player based on the at least one location and further based on a machine learning model.

In some embodiments, a system is disclosed herein. The system may comprise a processor; and a memory having programming instructions stored thereon, which, when executed by the processor, causes the system to perform operations comprising: receiving raw body pose data of a plurality of players in a video frame of a sporting event video feed. The operations may further comprise retrieving location data for the plurality of players in the video frame. The operations may further comprise determining correspondence between at least one location from the location data to a raw body pose data of at least one player of the plurality of players. The operations may further comprise denoising and refining the raw body pose data of the at least one player based on the at least one location and further based on a machine learning model.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Conventional sports analytics are generally confined to generating and providing location data of the players. The location data is generally a one-dimensional dot that moves across a two-dimensional rendering of the play area. There is generally a lack of robust, error-free body pose data in conventional sports analytics.

Embodiments described herein attempt to provide a technical solution to bridge the aforementioned gap. Using the embodiments described herein, the location data may be used to establish a correspondence between the location data and raw body pose data that may have been collected during the generation of the location data. The raw body pose data may inherently be noisy. For example, within a bounding box for a location, there may be multiple body poses. In some embodiments, the bounding box may contain multiple locations for a single body pose. In some embodiments, there may be multiple body poses and multiple locations within the bounding box, thereby generating a noisy correspondence between the locations and the body poses.

Furthermore, there may be other sources of noise in the body pose data. The body poses may have missing limbs or limbs with unusual length ratio. Also, a video frame might contain body poses of spectators in addition to the body poses of the players.

The noise in the correspondence between the body poses and a location may be mitigated by selecting a body pose with a middle of foot keypoints with the shortest distance from the location. Machine learning may be used to estimate the correct length and position of the missing limbs. Machine learning may further be used for estimating the correct length of limbs with unusual length ration. Spectator body poses may be filtered out. Too many noisy body poses may also be filtered out. Such denoised and refined body pose data may be used for other downstream processing, such projecting the two dimensional body pose data into a three dimensional rendering of the play area.

Figure 1:
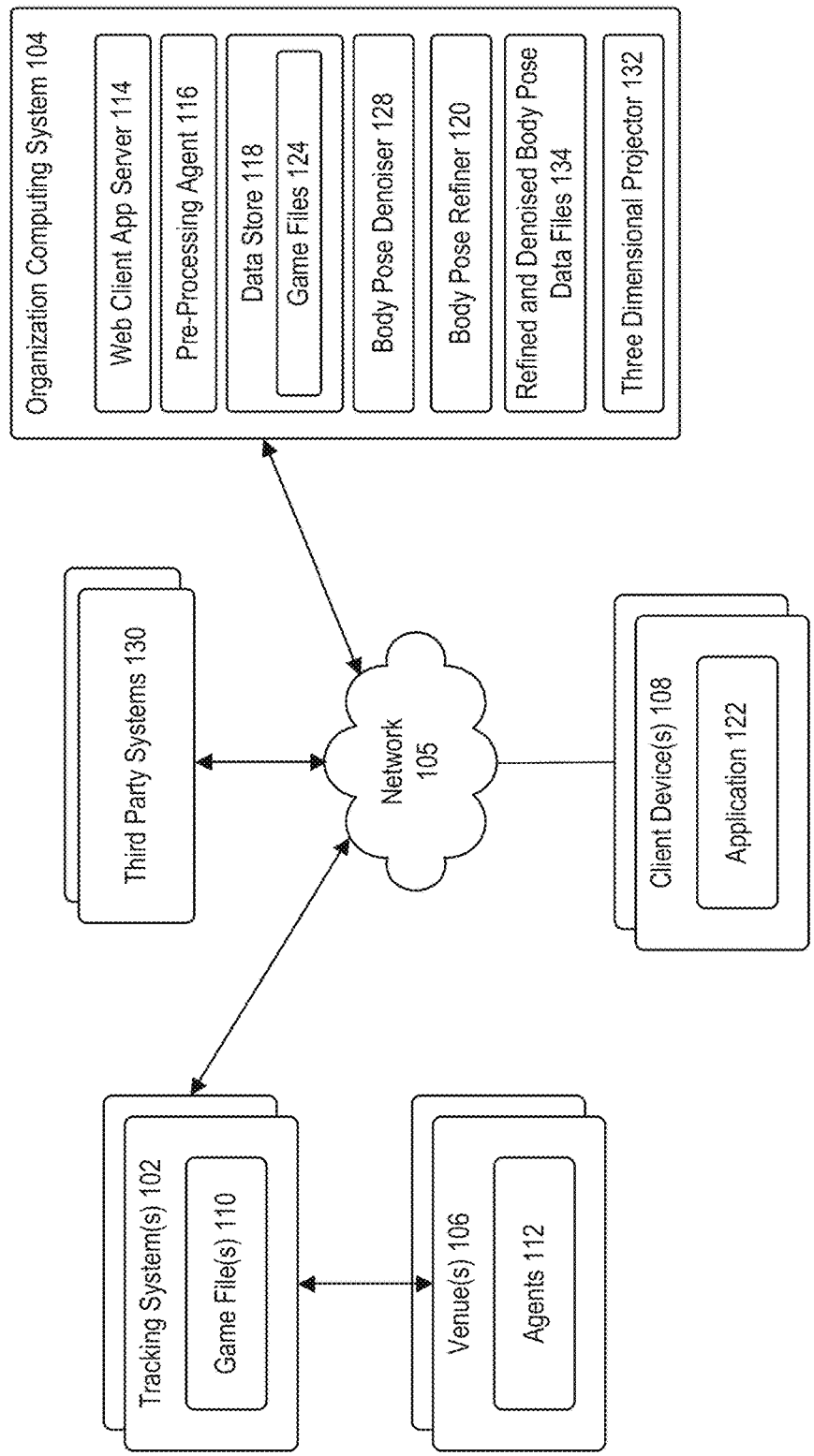
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, one or more client devices 108, and one or more third party systems 130; all communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of computing environment 100.

Tracking system 102 may be at a venue 106 (e.g., a basketball court). For example, venue 106 may be configured to host a sporting event (e.g., a basketball match) that includes one or more agents 112. Tracking system 102 may be configured to capture the motions of all agents (e.g., basketball players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional spatial locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102 and further manage and analyze data received from third party systems 130. Organization computing system 104 may include at least a web client application server 114, a pre-processing agent 116, a data store 118, a body pose refiner 120, a body pose denoiser 128, refined and denoised body pose data files 134, and a three dimensional projector 132. One or more of these components may comprise software modules that may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include video data of a given match. For example, the video data may correspond to a plurality of video frames captured by tracking system 102. In some embodiments, the video data may correspond to broadcast data of a given match, in which case, the video data may correspond to a plurality of video frames of the broadcast feed of a given match. The broadcast feed may be received from the third party systems 130. Other examples of video data may include video recording of a broadcast feed.

Pre-processing agent 116 may be configured to process data retrieved from data store 118. For example, pre-processing agent 116 may be configured to generate game files 124 stored in data store 118. For example, pre-processing agent 116 may be configured to generate a game file 124 based on data captured by tracking system 102. In some embodiments, pre-processing agent 116 may further be configured to store tracking data associated with each game in a respective game file 124. Tracking data may refer to the (x, y) coordinates of all players and balls on the playing surface during the game. In some embodiments, pre-processing agent 116 may receive tracking data directly from tracking system 102. In some embodiments, pre-processing agent 116 may derive tracking data from the broadcast feed of the game, received from the third party systems 130. The tracking data derived from the third party systems 130 may not have a complete picture of all the players in the game, and the pre-processing agent 116 may determine and append the missing data.

Game files 124 may also include raw body pose data that may have been used to generate the tracking data. The raw body pose data may include, for example, a bounding box that may have been used to identify a body pose corresponding to a location. However, the raw body pose data may be noisy at least for the bounding box may include multiple body poses for one location, multiple locations for one body pose, and multiple locations and multiple body poses thereby generating a noisy association between the body poses and the locations. The raw body pose data may also be missing limbs and/or may have an abnormal length ration. Furthermore, the raw body pose data may also include spectator body poses that may have to be filtered out.

Body pose denoiser 128 may replace the errors (or noise) in the raw body pose data with estimated corrections. For example, body pose denoiser 128 may estimate the position and length of a missing limb in a body pose. Additionally or alternatively, body pose denoiser 128 may replace a limb or a torso of an abnormal length ratio with a limb or a torso with a normal length ratio. Body pose denoiser 128 may use one or more machine learning models.

Body pose refiner 120 may further rectify errors and/or filter out unnecessary data from the body pose data. For example, body pose refiner 120 may filter out data that may be too erroneous. Body pose refiner 120 may also filter out spectator body poses. After the denoising and refining, body pose denoiser 128 and body pose refiner 120 may generate refined and denoised body pose data files 134. It should also be understood that the functionality of body pose refiner 120 and body pose denoiser 128 may be interchangeable. Three dimensional projector 132 may then project the body poses in the refined and denoised body pose data files 134 in a three dimensional space that may represent a playing field (e.g., a basketball court).

Client device 108 may be in communication with organization computing system 104 via network 105. Client device 108 may be operated by a user. For example, client device 108 may include a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least one application 122. Application 122 may be representative of a web browser that allows access to a website or may be a stand-alone application. Client device 108 may use application 122 to access one or more functionalities of organization computing system 104. Client device 108 may communicate over network 105 to request a webpage, for example, from web client application server 114 of organization computing system 104. For example, client device 108 may be configured to execute application 122 to access the body poses in the refined and denoised body pose data files. Alternatively or additionally, the client device 108 may execute the application 122 to retrieve the three dimensional projection generated by the three dimensional projector 132. The content that is displayed to client device 108 may be transmitted from web client application server 114 to client device 108, and subsequently processed by application 122 for display through a graphical user interface (GUI) of client device 108.

Figure 2:
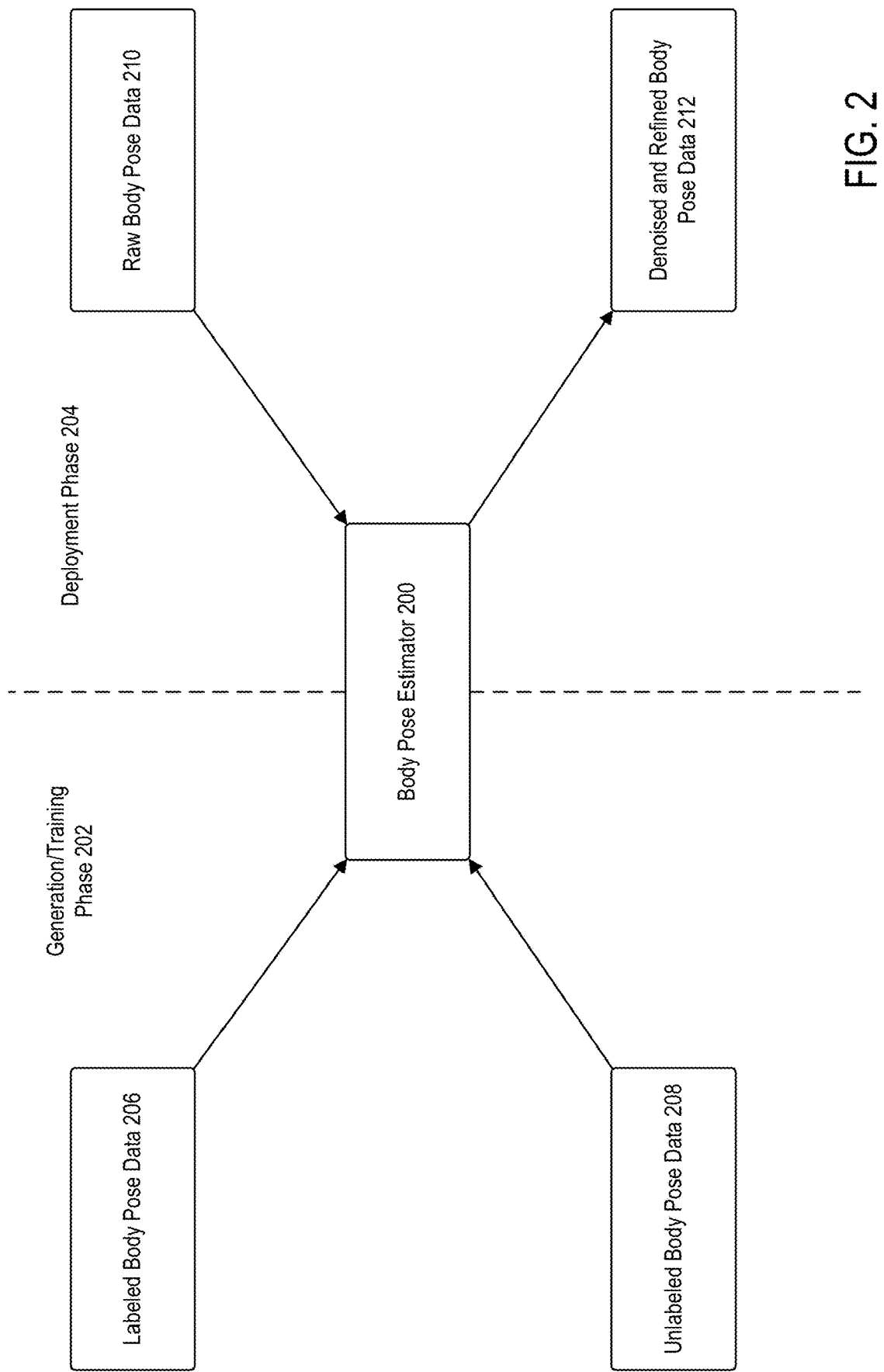
FIG. 2 is a block diagram illustrating a body pose estimator, according to example embodiments.

FIG. 2 is a block diagram illustrating a body pose estimator 200, according to example embodiments. Body pose estimator 200 may include the body pose denoiser 128 and the body pose refiner 120. Body pose estimator 200 may use a machine learning model. During a generation/training phase 202, body pose estimator 200 may be fed with labeled body pose data 206 for supervised learning. Additionally or alternatively, body pose estimator 200 may be fed with unlabeled body pose data 208 for an unsupervised learning. Body pose estimator 200 may use any kind of machine learning model such as a convolutional neural network or a deep neural network.

During a deployment phase 204, a raw body pose data 210 may be provided to the body pose estimator. Raw body pose data 210 may have noises such as non-correspondence between locations and body poses in bounding boxes, missing limbs or limbs with unusual length ration, and/or presence of spectators in the video frames. Body pose estimator 200, based on its learning in the generation/training phase 202, may generate the denoised and refined body pose data 212. Denoised and refined body pose data 212 may have estimates for missing limbs or limbs having unusual length. Denoised and refined body pose data 212 may also have the spectator data filtered out. Denoised and refined body pose data 212 may also have too noisy data filtered out.

Figure 3:
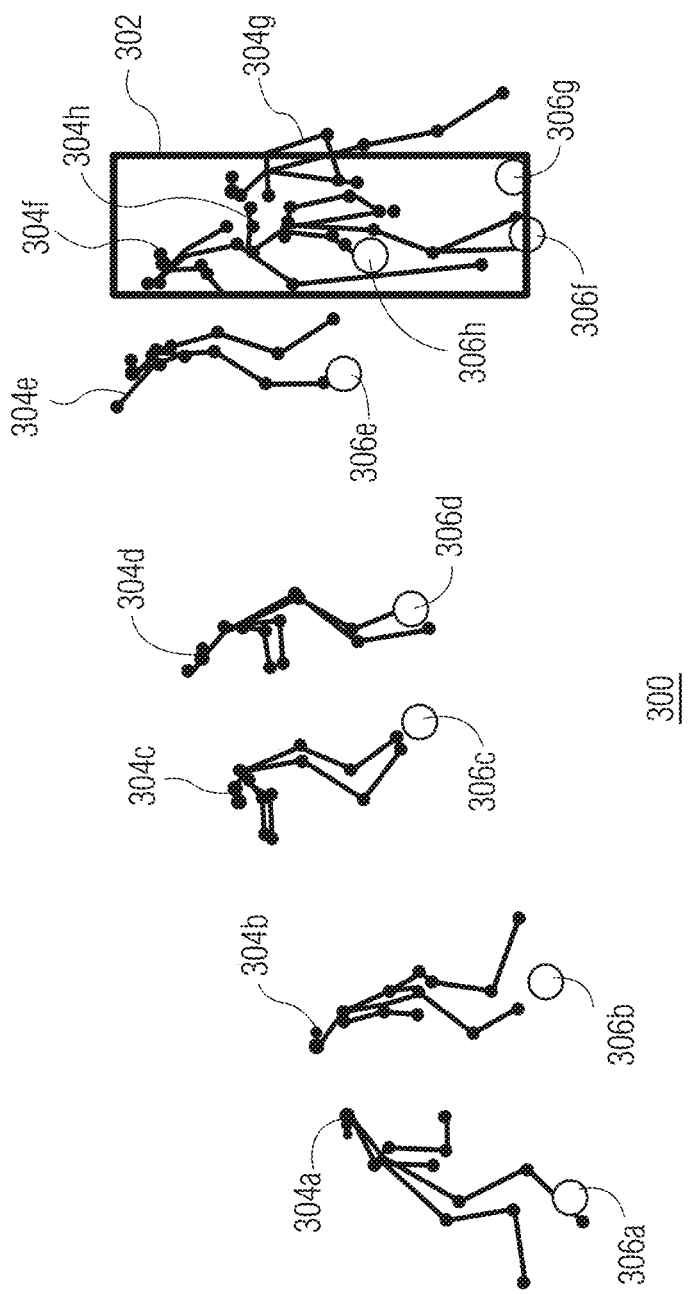
FIG. 3 illustrates a visualization showing a body pose error associated with a bounding box, according to example embodiments.

FIG. 3 illustrates a visualization 300 of an error associated with location data and bounding box data, according to example embodiments. Visualization 300 and the several other visualizations discussed below may be presented in graphical user interfaces and/or may be graphical representations of the data being processed. Visualization 300 may show locations 306a-306h for body poses 304a-304h. Bounding box 302 may include three locations 306f, 306g, and 306h corresponding to three body poses 304f, 304g, and 304h. In other words, for each of the three locations 306f, 306g, and 306h, the corresponding body pose may be any of the body poses 304g, 304g, and 304h. Therefore, there may be no one-to-one correspondence of location data and bounding box data to show a match between a body pose (e.g., body poses 304a-304h) and a location (e.g., 306a-306h).

Figure 4:
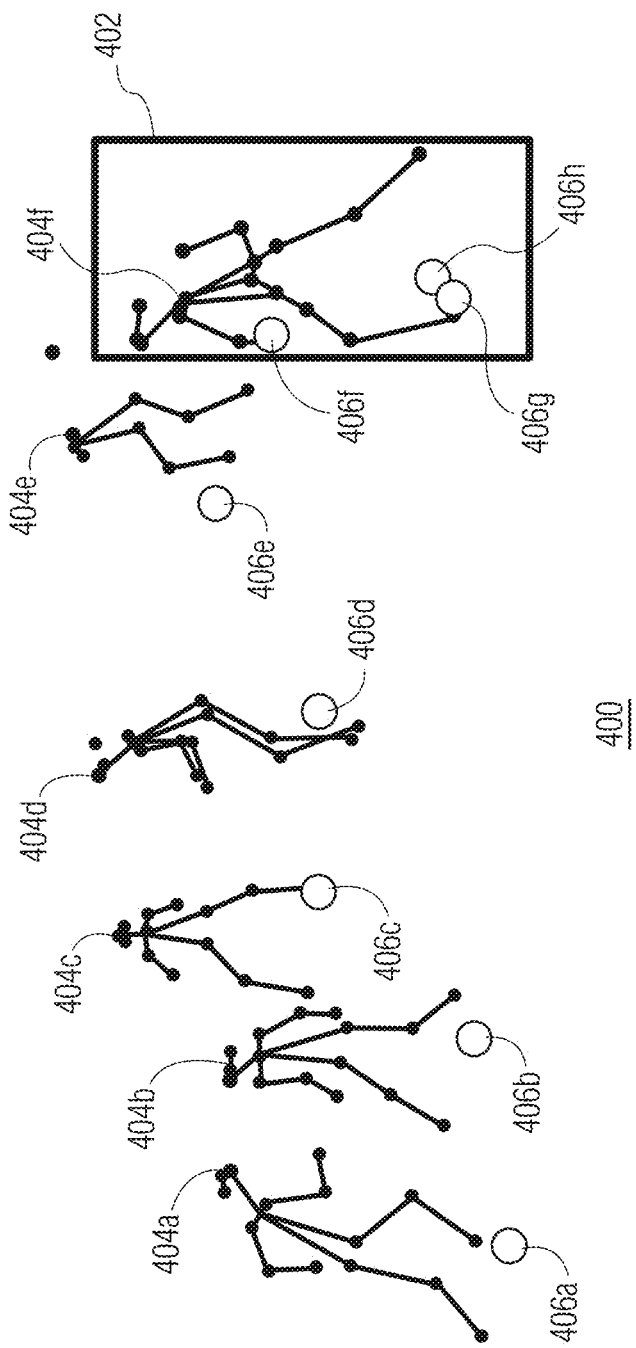
FIG. 4 illustrates a visualization showing another body pose error associated with the bounding box, according to example embodiments.

FIG. 4 illustrates another visualization 400 of an error associated with location data and bounding box data, according to example embodiments. Visualization 400 may show locations 406a-406h, with location 406a corresponding to body pose 404a, location 406b corresponding to body pose 404b, location 406c corresponding to location 404c, location 406d corresponding to body pose 404d, and location 406e corresponding to body pose 404e. However, within the bounding box 402, there is a single body pose 404f and three locations 406f, 406g, and 406h. Therefore, there is an error condition as to the lack of one-to-one correspondence of the body pose 404f to any of the locations 406f, 406g, and 406h.

Figure 5:
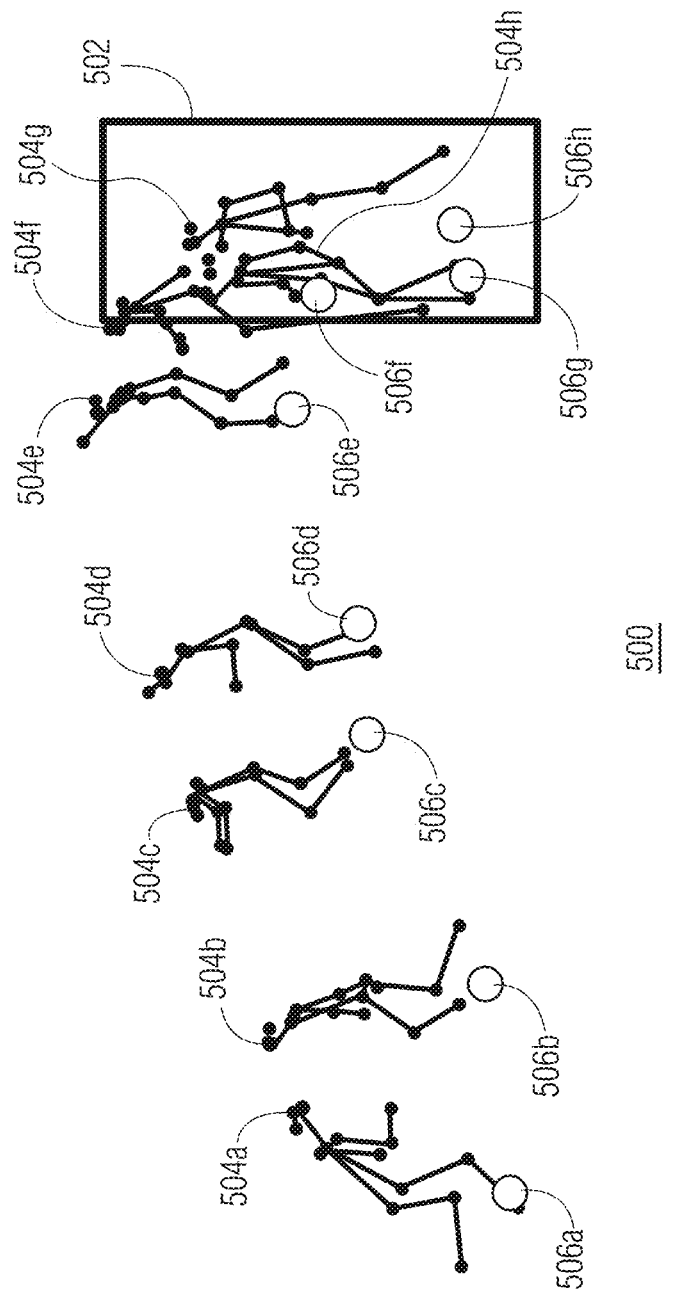
FIG. 5 illustrates a visualization showing yet another body pose error associated with the bounding box, according to example embodiments.

FIG. 5 illustrates another visualization 500 of an error associated with location data and bounding box data, according to example embodiments. Visualization 500 shows locations 506a-506h with location 506a corresponding to body pose 504a, location 506b corresponding to body pose 504b, location 506c corresponding to body pose 504c, location 506d corresponding to body pose 504d, and location 506e corresponding to body pose 504e. However, within a bounding box 502, the correspondence between the locations 506f, 506g, and 506h and body poses 504f, 504g, and 504h may be unclear. Therefore, visualization 500 shows an error condition with the potentially ambiguous correspondence between the location and the body poses.

Figure 6:
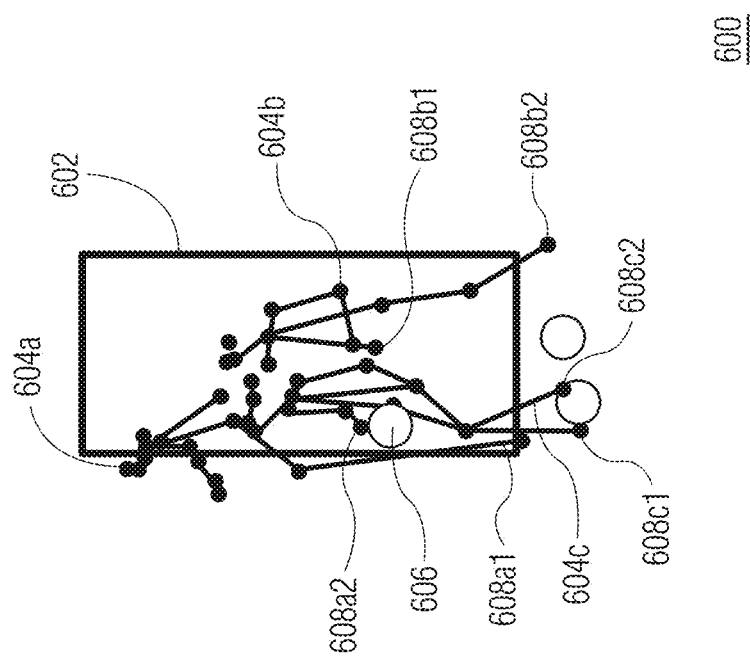
FIG. 6 illustrates a visualization showing a correction of a body pose error associated with the bounding box, according to example embodiments.

FIG. 6 illustrates a visualization 600 of an example method of correcting an error of multiple body poses being close to a single location, according to example embodiments. As shown in visualization 600, within a bounding box 602, there is a single location 606 but with three body poses 604a, 604b, and 604c. There may be, therefore, an ambiguity as to which of the three body poses 604a, 604b, and 604c corresponds to location 606. An example method for correcting the error may be to select a body pose with the lowest distance between the location 606 and the middle of the foot keypoints. As shown, body pose 604a may include foot keypoints 608a1 and 608a2, body pose 604b may include foot keypoints 608b1 and 608b2, and body pose 604c may include foot keypoints 608c1 and 608c2. Here, the middle of the foot keypoints with the lowest distance from the location 606 may be the foot keypoints 608a1 and 608a2. Therefore, to remove the ambiguity of having multiple body poses for a single location with a bounding box, body pose 604a may be selected to correspond to the location 606. Similar lowest distance strategy may be used to determine a correspondence between locations and body poses in bounding boxes including multiple locations and multiple body poses.

Figure 7:
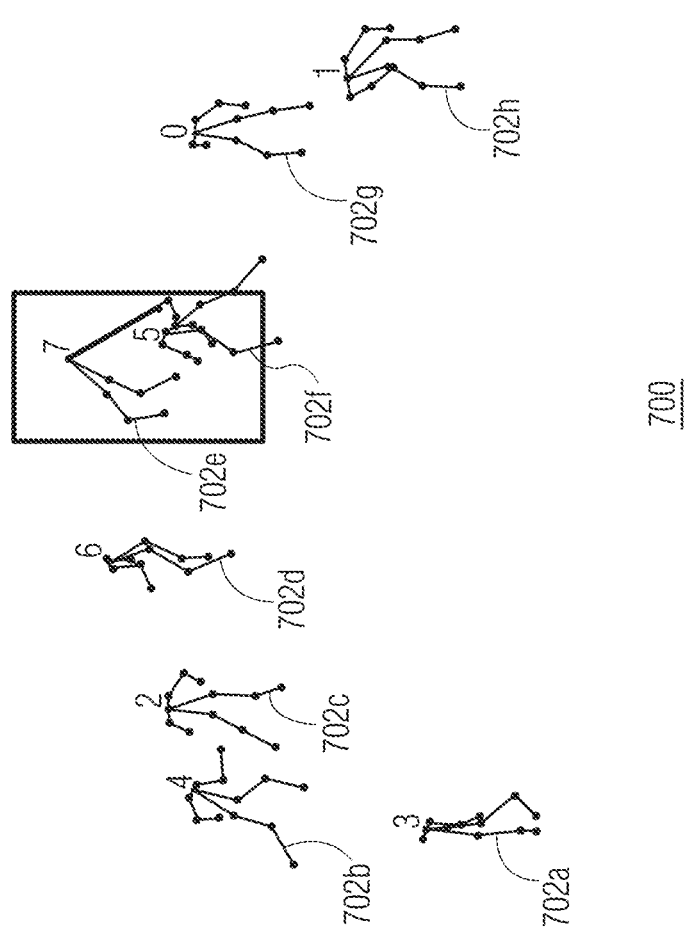
FIG. 7 illustrates a visualization a body pose error, according to example embodiments.

FIG. 7 illustrates a visualization 700 of an error in body poses, according to example embodiments. More specifically, visualization 700 may show that among the body poses 702a-702h, body pose 702e (as shown, corresponding to player 7) is missing a limb (right hand) and another limb (left hand) has an unrealistic length ration compared to the body and other limbs. Embodiments disclosed herein may correct these and other body pose errors using machine learning techniques. For example, a base line of body pose may be generated. The base line may include, for example, normal length ratio of limbs and the positions of the limbs within the torso. Using this base line, correction for the missing limbs or limbs with erroneous length ratio may be estimated.

Figure 8A:
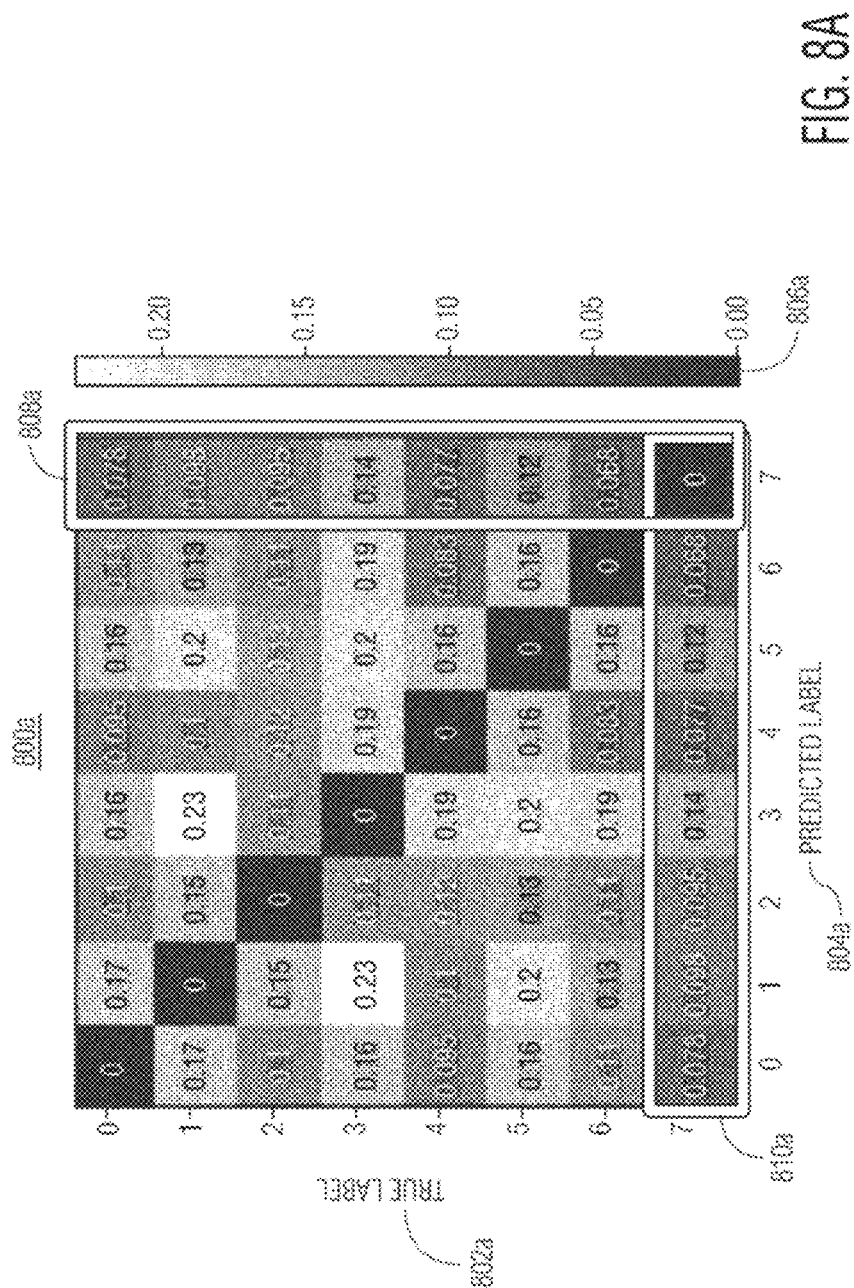
FIG. 8A illustrates a visualization of correcting body pose errors using a machine learning model, according to example embodiments.
Figure 8B:
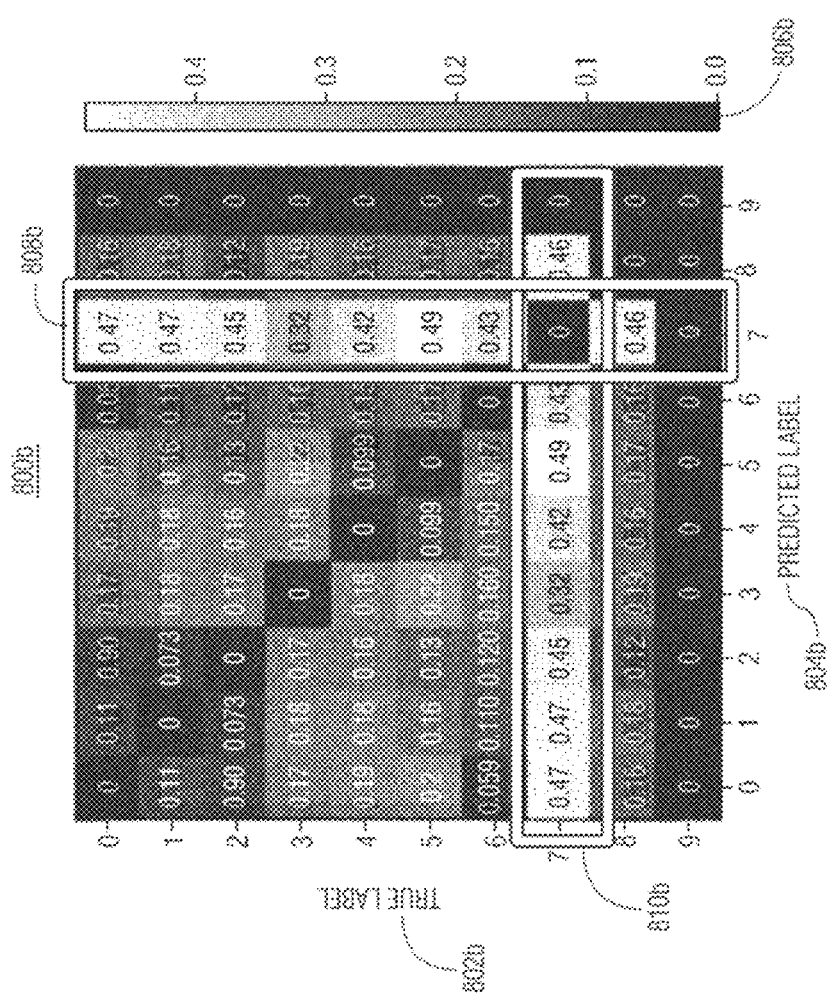
FIG. 8B illustrates a visualization of correcting body pose errors using a machine learning model, according to example embodiments.

FIG. 8A illustrates visualization 800a, according to example embodiments. FIG. 8B illustrates visualization 800b, according to example embodiments. Visualizations 800a and 800b may show the use of machine learning to correct the body pose errors, such as the ones illustrated in visualization 700, according to example embodiments. A body pose may be represented in terms of a feature set, which may numerically represent different idiosyncrasies of the body pose. A machine learning model may learn the correct feature sets (e.g., not missing limbs and/or not having limbs that may be unusually short or unusually log). The learning process may either be supervised, unsupervised, or a combination of both. Using a trained machine learning model, corrections for erroneous features may be estimated. As illustrated, both selected portions of the visualizations 800a and 800b may correspond estimating the corrected features of the body pose 702e (of player 7). True labels 802a and 802b, which may be manually labeled data may be predicted using the machine learning model by generating the predicted labels 804a and 804b. Predicted labels 804a and 804b may in turn be associated with the significance levels 806a and 806b of the prediction. As illustrated herein, the predicted label 804a (shown as row 810a) for body pose 702e may closely match true label 802a (shown as column 808a); and predicted label 804b (shown as row 810b) for the body pose 702e may closely match the true label 802b (shown as column 808b).

Figure 9:
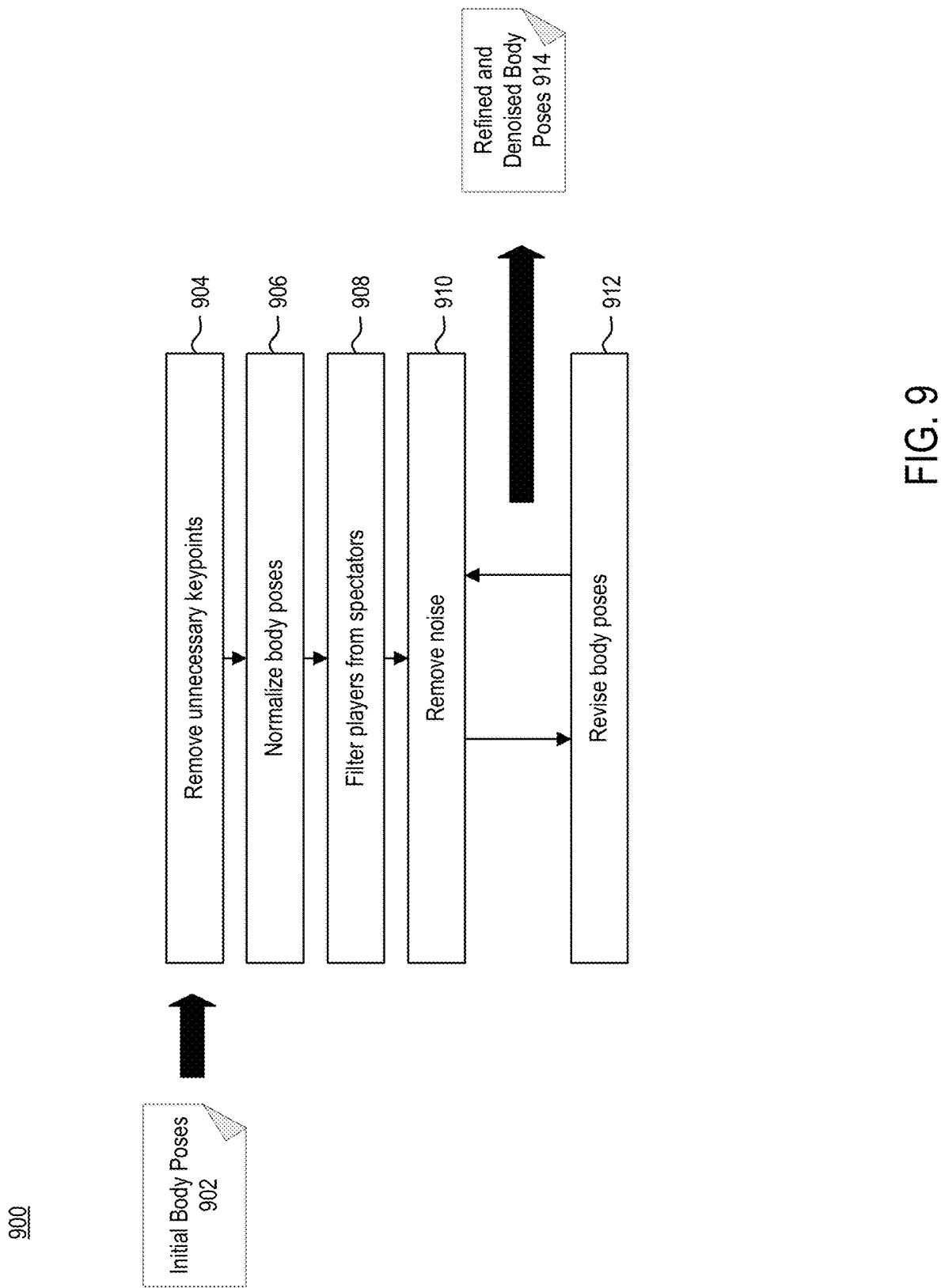
FIG. 9 is a flow chart showing an illustrative method of refining and denoising body poses, according to example embodiments.

FIG. 9 is a flow chart of an illustrative method 900 of generating refined and denoised body poses, according to the example embodiments. Method 900 may be performed by any of computing devices shown in FIG. 1 and described above. It should be understood that the steps shown in FIG. 9 and described herein are merely examples; and methods with additional, alternate, or fewer number of steps should also be considered within the scope of this disclosure.

Method 900 may begin at step 904, where initial body poses 902 may be received and unnecessary keypoints may be removed. The keypoints may correspond to various aspects of the poses. For example, keypoints may represent the limbs, the joints, the head, and the torso of a corresponding player. A combination of these keypoints may therefore define a body pose. However, within the received initial body poses 902, keypoints may be ambiguously assigned. For example, when two players are close by (e.g., a defensive block against an offensive play), the two different keypoints may intermingle within a single frame location. The keypoints may therefore by grouped by the body poses. Other examples of the unnecessary keypoints may include keypoints showing unusually long or short limbs, misplaced limbs, misplaced head, and/or other errant keypoints associated with the body poses.

At step 906, the body poses may be normalized. The normalization process may include using a machine learning model to estimate the missing keypoints and/or to estimate correct keypoints corresponding to the erroneous keypoints removed in step 904. After the normalization process, the body poses may have the keypoints within normal thresholds of an established baseline.

At step 908, the players may be filtered from spectators. The filtration may be based on the body pose data type and/or movement data. With regard to the body pose data type, a baseline may be established for the body poses of the spectators. The baseline may represent that that the spectators may generally be seated and/or may not have flexed their limbs out. With regards to the movement data, a baseline movement of the spectators may be different from the baseline movement of the players. The players may move fact and continuously across the court, while the spectators may generally be confined to their seats. Any spectator movement may be slow and may not generally involve running or dribbling a ball. Therefore, using the above heuristics and/or other heuristics, the players may be filtered from the spectators and the subsequent analysis may involve only the body pose of the players.

At step 910, the noise from the body poses may be removed. The noise removal may include, for example, identifying body poses that correspond to player locations, apply for correction estimates to the normalized body poses, and/or removing other sources of noise.

At step 912, the body poses may be refined. The refinement may include applying additional corrections to the denoised body pose. For example, more subtle changes may be applied to correct the correspondence between the body pose and the location. Machine learning model with finer resolutions may be applied to further refine the position, length, and orientation of the limbs, head, and the torso.

As illustrated, steps 910 and 912 may be applied iteratively, with iterative denoising and refinement to generate refined and denoised body poses 914 for other applications (e.g., for projecting the two dimensional refined and denoised body poses 914 to three dimensional play areas).

Figure 10:
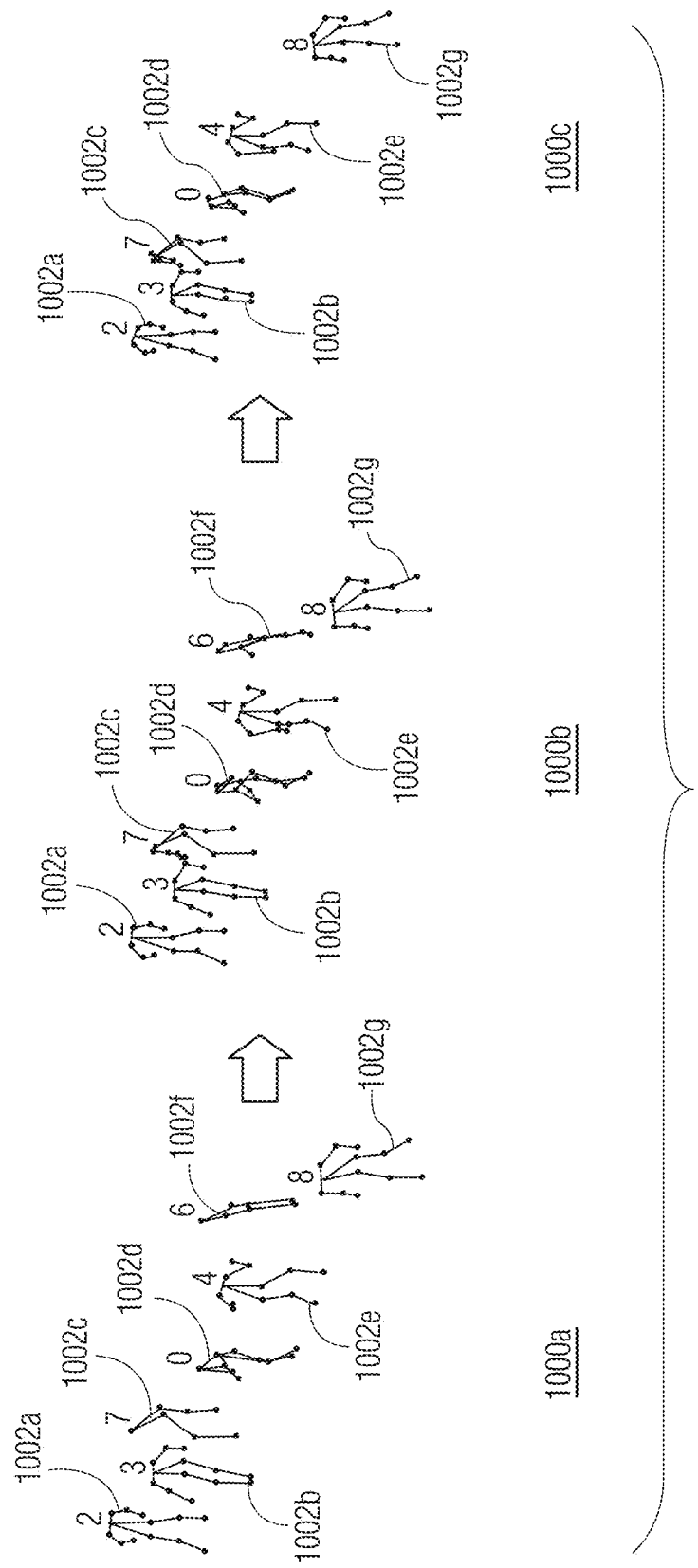
FIG. 10 illustrates visualizations that show refining and denoising body pose errors, according to example embodiments.

FIG. 10 illustrates a visualization 1000a and updated visualizations 1000b and 1000c showing an example of pose refinement and denoising (also referred to as noise removal), according to example embodiments. In particular, the visualization 1000a shows body poses 1002a-1002g before pose refinement and denoising. The updated visualization 1000b shows the body poses 1002a-1002g after pose refinement. In particular, a missing limb may have been identified for body pose 1002c, a missing portion of a limb may have been identified for body pose 1002e, and a missing limb may have been identified for body pose 1002f. The updated visualization 1000c shows the body poses 1002a-1002e and 1002g after denoising. In particular, the denoising may have filtered out the body pose 1002f, which may have been a false positive, a spectator, or a very noisy body pose that may impact the downstream processing (e.g., projecting body poses to an (x,y,z) plane.

Figure 11:
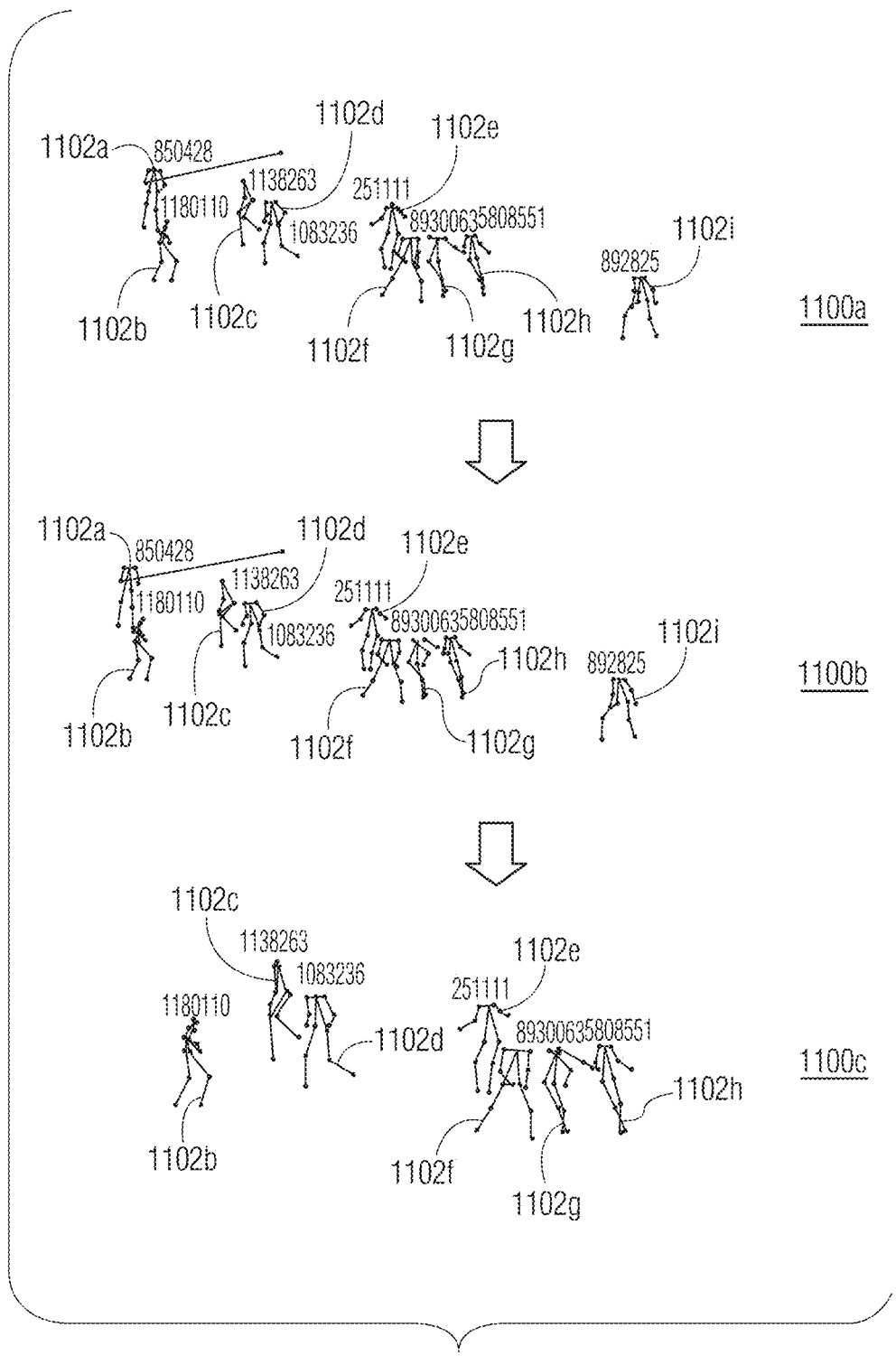
FIG. 11 illustrates visualizations that show refining and denoising body pose errors, according to example embodiments.

FIG. 11 illustrates a visualization 1100a and updated visualizations 1100b and 1100c showing another example of pose refinement and denoising, according to example embodiments. In particular, the visualization 1100a shows body poses 1102a-1102i without pose refinement and denoising. The updated visualization 1100b shows body poses 1102a-1102i after refinement. The refinement may have added a limb to body pose 1102g. The denoising process may have filtered out the body poses 1102a and 1102i as being too noisy and/or not being relevant to downstream processing.

Figure 12A:
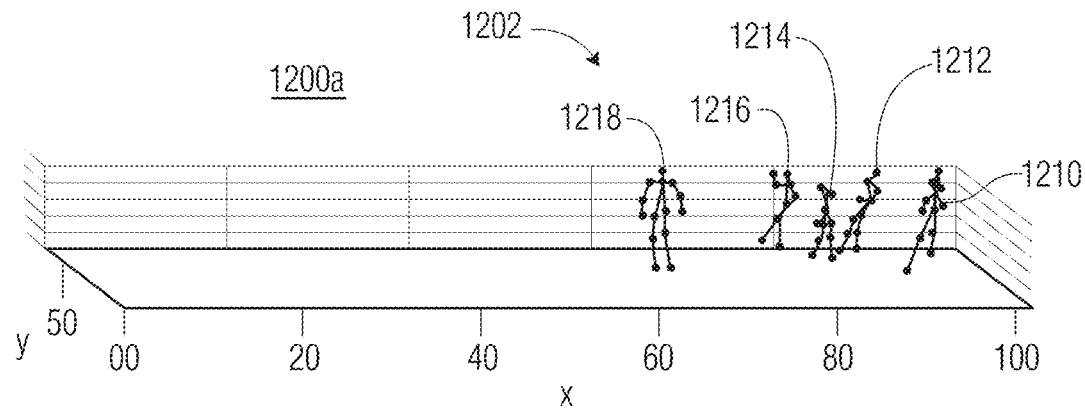
FIG. 12A illustrates a first visualization that shows projecting refined and denoised two dimensional body pose data to a three dimensional play surface, according to example embodiments.
Figure 12B:
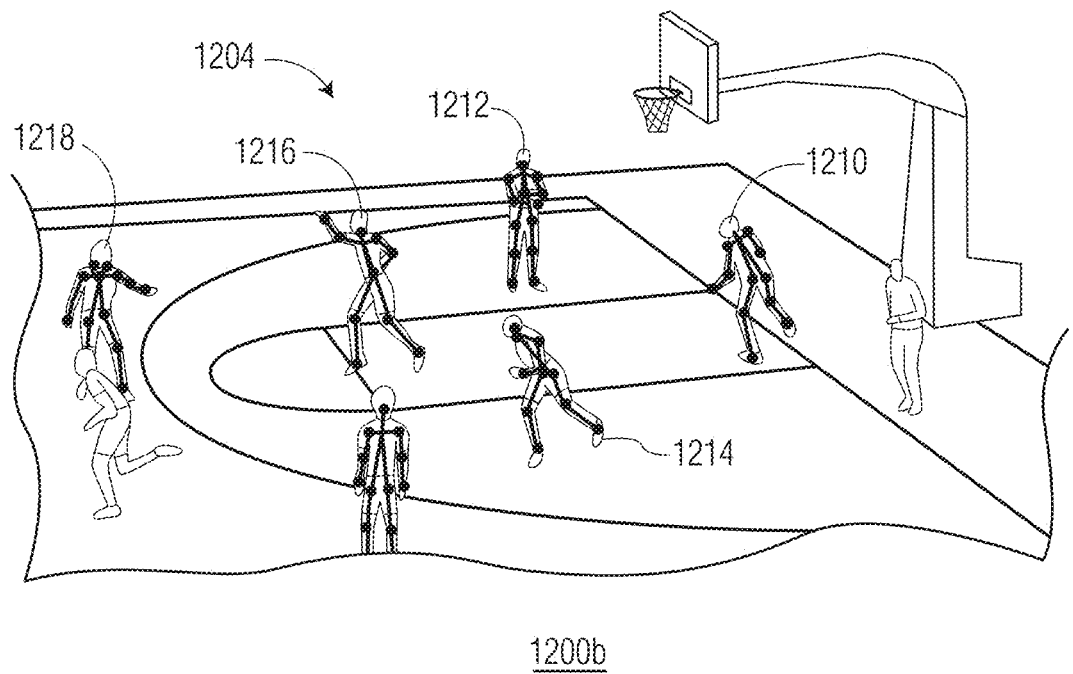
FIG. 12B illustrates a second visualization that shows projecting refined and denoised two dimensional body pose data to a three dimensional play surface, according to example embodiments.

FIG. 12A illustrates visualization 1200a, according to example embodiments. FIG. 12B illustrates visualization 1200b, according to example embodiments. Visualizations 1200a and 1200b may show projection of body pose data to an (x,y,z) plane, according to example embodiments. In particular, visualization 1200a may include two-dimensional body poses 1202 for player 1210, player 1212, player 1214, player 1216, and player 1218 that may be generated, refined, and denoised from a broadcast visualization 1200b showing the same players, using the several embodiments described above. The positions of players 1210-1218 in broadcast visualization 1200b may be projected to an (x,y,z) plane in the visualization 1200a. Therefore, the movement of the players 1204 in the broadcast may be visualized as two-dimensional body poses 1202 in a three-dimensional system.

Figure 13A:
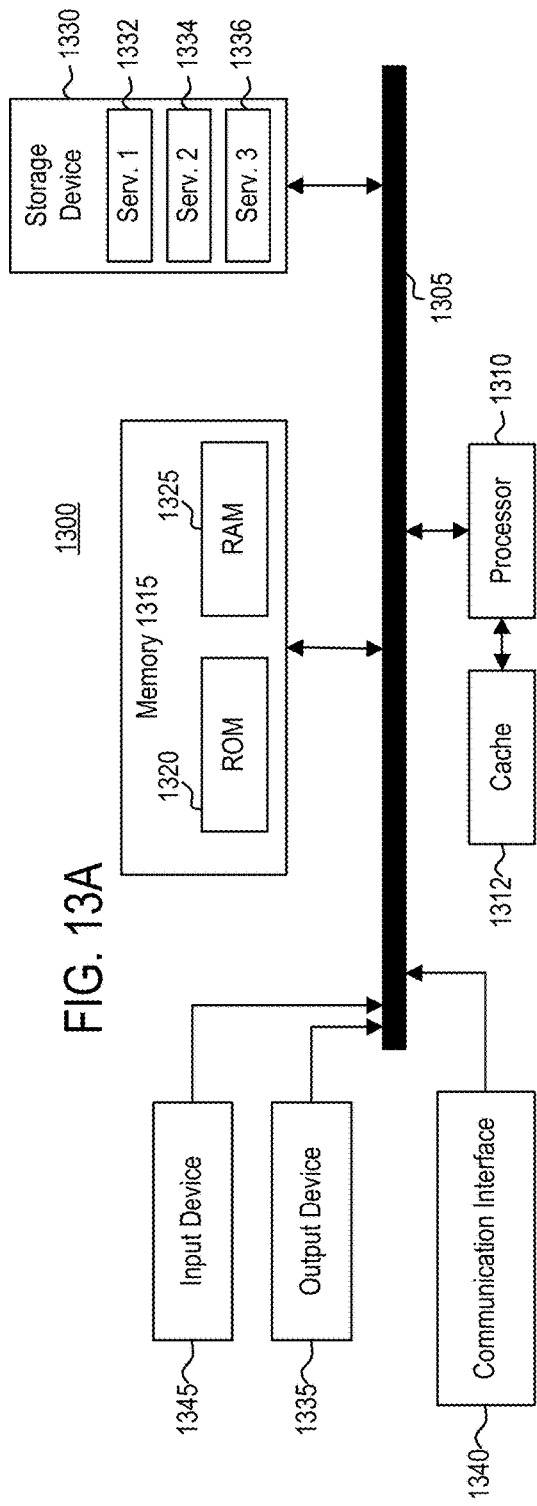
FIG. 13A illustrates an architecture of computing system, according to example embodiments.

FIG. 13A illustrates an architecture of computing system 1300, according to example embodiments. System 1300 may be representative of at least a portion of organization computing system 104. One or more components of system 1300 may be in electrical communication with each other using a bus 1305. System 1300 may include a processing unit (CPU or processor) 1310 and a system bus 1305 that couples various system components including the system memory 1315, such as read only memory (ROM) 1320 and random access memory (RAM) 1325, to processor 1310. System 1300 may include a cache of high-speed memory connected directly with, in close proximity to, or integrated as part of processor 1310. System 1300 may copy data from memory 1315 and/or storage device 1330 to cache 1312 for quick access by processor 1310. In this way, cache 1312 may provide a performance boost that avoids processor 1310 delays while waiting for data. These and other modules may control or be configured to control processor 1310 to perform various actions. Other system memory 1315 may be available for use as well. Memory 1315 may include multiple different types of memory with different performance characteristics. Processor 1310 may include any general purpose processor and a hardware module or software module, such as service 1 1332, service 2 1334, and service 3 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction with the computing system 1300, an input device 1345 may represent any number of input mechanisms, such as a microphone for speech, a touch-sensitive screen for gesture or graphical input, keyboard, mouse, motion input, speech and so forth. An output device 1335 (e.g., display) may also be one or more of a number of output mechanisms known to those of skill in the art. In some examples, multimodal systems may enable a user to provide multiple types of input to communicate with computing system 1300. Communications interface 1340 may generally govern and manage the user input and system output. There is no restriction on operating on any particular hardware arrangement and therefore the basic features here may easily be substituted for improved hardware or firmware arrangements as they are developed.

Storage device 1330 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 1325, read only memory (ROM) 1320, and hybrids thereof.

Storage device 1330 may include services 1332, 1334, and 1336 for controlling the processor 1310. Other hardware or software modules are contemplated. Storage device 1330 may be connected to system bus 1305. In one aspect, a hardware module that performs a particular function may include the software component stored in a computer-readable medium in connection with the necessary hardware components, such as processor 1310, bus 1305, output device 1335, and so forth, to carry out the function.

Figure 13B:
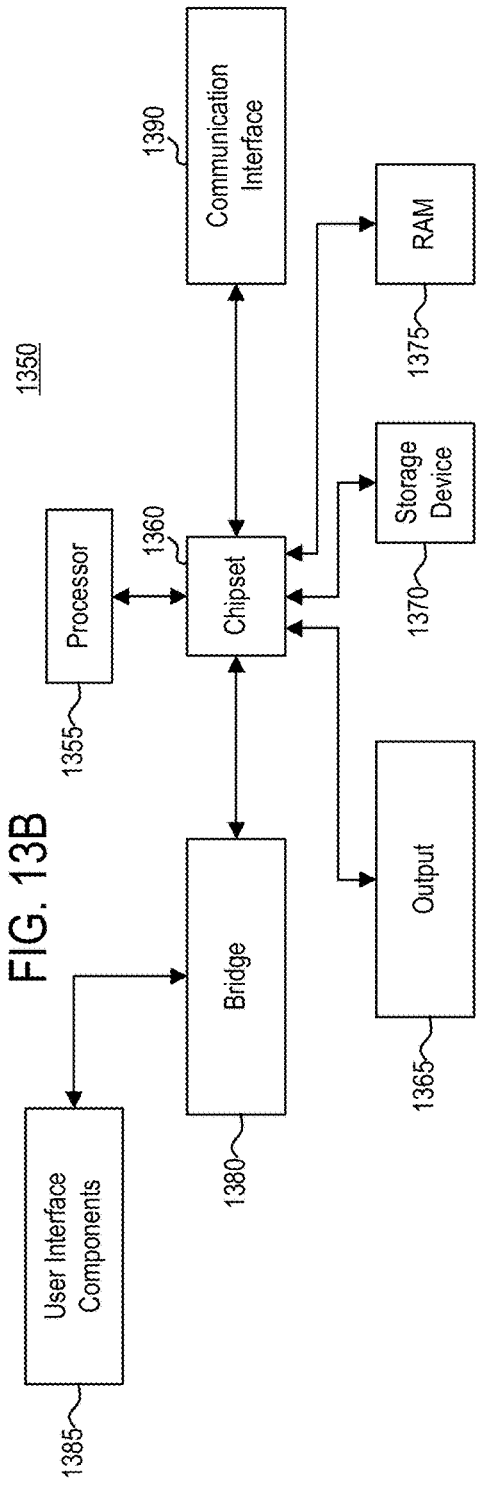
FIG. 13B illustrates a computer system having a chipset architecture, according to example embodiments.

FIG. 13B illustrates a computer system 1350 having a chipset architecture that may represent at least a portion of organization computing system 104. Computer system 1350 may be an example of computer hardware, software, and firmware that may be used to implement the disclosed technology. System 1350 may include a processor 1355, representative of any number of physically and/or logically distinct resources capable of executing software, firmware, and hardware configured to perform identified computations. Processor 1355 may communicate with a chipset 1360 that may control input to and output from processor 1355. In this example, chipset 1360 outputs information to output 1365, such as a display, and may read and write information to storage device 1370, which may include magnetic media, and solid-state media, for example. Chipset 1360 may also read data from and write data to RAM 1375. A bridge 1380 for interfacing with a variety of user interface components 1385 may be provided for interfacing with chipset 1360. Such user interface components 1385 may include a keyboard, a microphone, touch detection and processing circuitry, a pointing device, such as a mouse, and so on. In general, inputs to system 1350 may come from any of a variety of sources, machine generated and/or human generated.

Chipset 1360 may also interface with one or more communication interfaces 1390 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 1355 analyzing data stored in storage device 1370 or RAM 1375. Further, the machine may receive inputs from a user through user interface components 1385 and execute appropriate functions, such as browsing functions by interpreting these inputs using processor 1355.

It may be appreciated that example systems 1300 and 1350 may have more than one processor 1310 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method comprising:
receiving, by a computing system, raw body pose data of a plurality of players in a video frame of a sporting event video feed;
retrieving, by the computing system, location data for the plurality of players in the video frame;
determining, by the computing system, correspondence between at least one location from the location data to a raw body pose data of at least one player of the plurality of players, wherein the raw body pose data of the at least one player comprises a bounding box;
determining, by the computing system, that the at least one location is within the bounding box;
determining, by the computing system, a distance between the at least one location to a middle of keypoints of the raw body pose of the at least one player is lowest compared to corresponding distances between the at least one location data and middle of keypoints of raw body poses of other players; and
denoising and refining, by the computing system, the raw body pose data of the at least one player based on the at least one location and further based on a machine learning model.

2. The method of claim 1, wherein the denoising and refining the raw body pose data of the at least one player comprises:
determining, by the computing system, that the raw body pose data of the at least one player is missing a limb; and
estimating, by the computing system and using the machine learning model, position and length of the missing limb.

3. The method of claim 1, wherein the denoising and refining the raw body pose data of the at least one player comprises:
determining, by the computing system, that the raw body pose data of the at least one player includes a body part with an abnormal length ratio; and
estimating, by the computing system and using the machine learning model, a correct length ratio for the body part.

4. The method of claim 1, wherein the denoising and refining the raw body pose data of the at least one player comprises:
determining, by the computing system, the video frame comprises body pose data of one or more spectators; and
filtering out, by the computing system, the body pose data of the one or more spectators from the video frame.

5. The method of claim 1, further comprising:
determining, by the computing system, that a second body pose data includes a noise above a threshold; and
filtering out, by the computing system, the second body pose data from the video frame.

6. The method of claim 1, further comprising:
iteratively performing, by the computing system, the denoising and the refining.

7. A non-transitory computer readable medium comprising one or more sequences of instructions, which, when executed by a processor, causes a computing system to perform operations comprising:
receiving, by the computing system, raw body pose data of a plurality of players in a video frame of a sporting event video feed;
retrieving, by the computing system, location data for the plurality of players in the video frame;

determining, by the computing system, correspondence between at least one location from the location data to a raw body pose data of at least one player of the plurality of players, wherein the raw body pose data of the at least one player comprises a bounding box;

determining, by the computing system that the at least one location is within the bounding box;

determining, by the computing system, a distance between the at least one location to a middle of keypoints of the raw body pose of the at least one player is lowest compared to corresponding distances between the at least one location data and middle of keypoints of raw body poses of other players; and denoising and refining, by the computing system, the raw body pose data of the at least one player based on the at least one location and further based on a machine learning model.

8. The non-transitory computer readable medium of claim 7, wherein the denoising and refining the raw body pose data of the at least one player comprises:

determining, by the computing system, that the raw body pose data of the at least one player is missing a limb; and estimating, by the computing system and using the machine learning model, position and length of the missing limb.

9. The non-transitory computer readable medium of claim 7, wherein the denoising and refining the raw body pose data of the at least one player comprises:

determining, by the computing system, that the raw body pose data of the at least one player includes a body part with an abnormal length ratio; and estimating, by the computing system and using the machine learning model, a correct length ratio for the body part.

10. The non-transitory computer readable medium of claim 7, wherein the denoising and refining the raw body pose data of the at least one player comprises:

determining, by the computing system, the video frame comprises body pose data of one or more spectators; and filtering out, by the computing system, the body pose data of the one or more spectators from the video frame.

11. The non-transitory computer readable medium of claim 7, wherein the operations further comprise:

determining, by the computing system, that a second body pose data includes a noise above a threshold; and filtering out, by the computing system, the second body pose data from the video frame.

12. The non-transitory computer readable medium of claim 7, wherein the operations further comprise:

iteratively performing, by the computing system, the denoising and the refining.

13. A system comprising:

a processor; and a memory having programming instructions stored thereon, which, when executed by the processor, causes the system to perform operations comprising:

receiving raw body pose data of a plurality of players in a video frame of a sporting event video feed;

retrieving location data for the plurality of players in the video frame;

determining correspondence between at least one location from the location data to a raw body pose data of at least one player of the plurality of players, wherein the raw body pose data of the at least one player comprises a bounding box;

determining that the at least one location is within the bounding box;

determining a distance between the at least one location to a middle of keypoints of the raw body pose of the at least one player is lowest compared to corresponding distances between the at least one location data and middle of keypoints of raw body poses of other players; and denoising and refining the raw body pose data of the at least one player based on the at least one location and further based on a machine learning model.

14. The system of claim 13, wherein the denoising and refining the raw body pose data of the at least one player comprises:

determining that the raw body pose data of the at least one player is missing a limb; and estimating, using the machine learning model, position and length of the missing limb.

15. The system of claim 13, wherein the denoising and refining the raw body pose data of the at least one player comprises:

determining that the raw body pose data of the at least one player includes a body part with an abnormal length ratio; and estimating, using the machine learning model, a correct length ratio for the body part.

16. The system of claim 13, wherein the denoising and refining the raw body pose data of the at least one player comprises:

determining the video frame comprises body pose data of one or more spectators; and filtering out the body pose data of the one or more spectators from the video frame.

17. The system of claim 13, wherein the operations further comprise:

determining that a second body pose data includes a noise above a threshold;

and filtering out the second body pose data from the video frame.

* * * * *